United States Patent [19]
Espiritu

[11] Patent Number: 6,098,276
[45] Date of Patent: Aug. 8, 2000

[54] CONTACT FRONT EXTRACTION TOOL

[75] Inventor: Hermenegildo Altares Espiritu, Cerritos, Calif.

[73] Assignee: ITT Manufacturing Enterprises, Inc., Wilmington, Del.

[21] Appl. No.: 09/076,622

[22] Filed: May 12, 1998

[51] Int. Cl.⁷ .................................................. B23P 19/04
[52] U.S. Cl. ........................... 29/764; 29/758; 29/747; 29/752
[58] Field of Search ............................ 29/764, 758, 747, 29/762, 754, 854, 857, 278, 426.5; 279/42.3, 46.3; 439/744

[56] References Cited

U.S. PATENT DOCUMENTS

| | | | |
|---|---|---|---|
| 2,626,667 | 1/1953 | Spiller | 279/42.3 |
| 3,170,230 | 2/1965 | Gaizauskas | 29/203 |
| 3,197,849 | 8/1965 | Johnson | 29/764 |
| 3,380,141 | 4/1968 | Rofer | 29/764 |
| 3,802,049 | 4/1974 | Hennessey, Jr. | 29/203 |
| 3,837,661 | 9/1974 | Phillippi | 279/46.3 |
| 4,168,569 | 9/1979 | Fairbairn | 29/764 |
| 4,171,565 | 10/1979 | Boudreau et al. | 29/739 |
| 4,268,955 | 5/1981 | Daniels | 29/747 |
| 4,351,109 | 9/1982 | Kelly et al. | 29/747 |
| 4,494,305 | 1/1985 | Safai | 29/764 |
| 4,516,787 | 5/1985 | Venable | 279/42.3 |
| 4,776,816 | 10/1988 | Herscovici et al. | 439/744 |
| 5,040,289 | 8/1991 | Flaynik | 29/764 |
| 5,161,301 | 11/1992 | Kilsdonk | 29/739 |
| 5,575,691 | 11/1996 | Matthews | 439/744 |

*Primary Examiner*—Lee Young
*Assistant Examiner*—A. Dexter Tugbang
*Attorney, Agent, or Firm*—Thomas L. Peterson

[57] ABSTRACT

A tool (34, 144) is provided for extracting a contact (16, 112) from the front end of a connector, which not only has a sleeve (70) to release a locking clip (30) that holds the contact in position, but that also has a highly resilient grasping clip (80) that grasps the contact to pull it out when the tool is withdrawn from the connector. In a tool for a connector which has a barrel (29) lying within the locking clip and that has a smaller diameter location (32) forward of the barrel, the grasping clip (80) with spring fingers (86) lies in the sleeve at a position wherein the spring fingers can grasp the smaller diameter location of the contact to pull out the contact. A tool (144) for a contact (112) wherein the barrel (132) extends along the entire forward length of the contact but a front portion (170) of the barrel projects forward of the connector insulator, has a grasping clip (160) that lies in a sleeve part of greater bore diameter than the forward sleeve portion (142) that releases the locking clip from the contact.

11 Claims, 3 Drawing Sheets

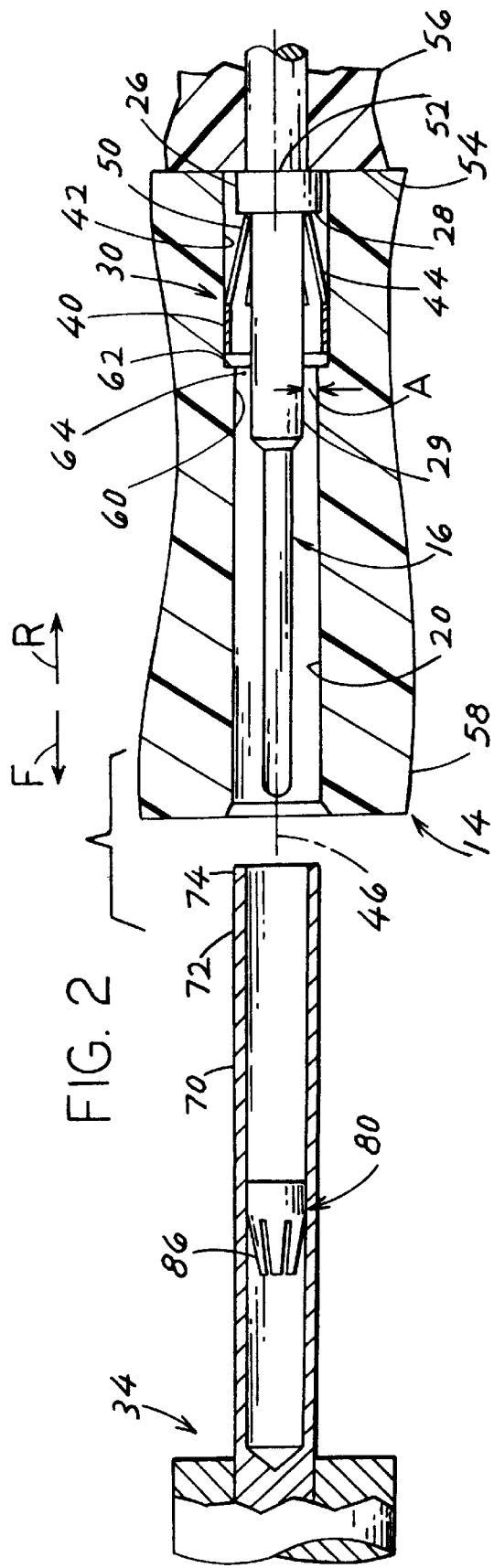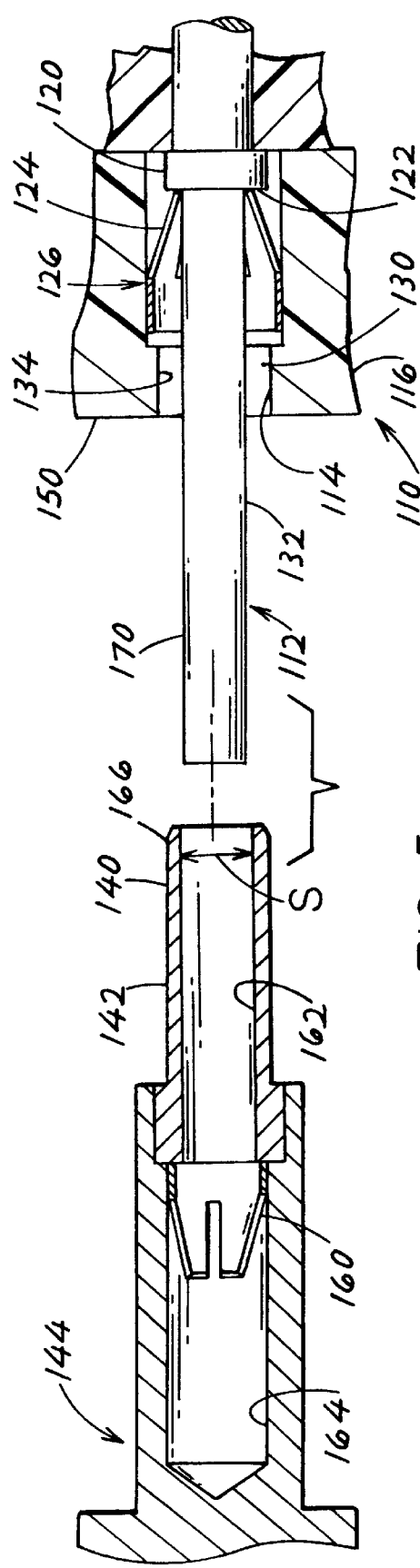

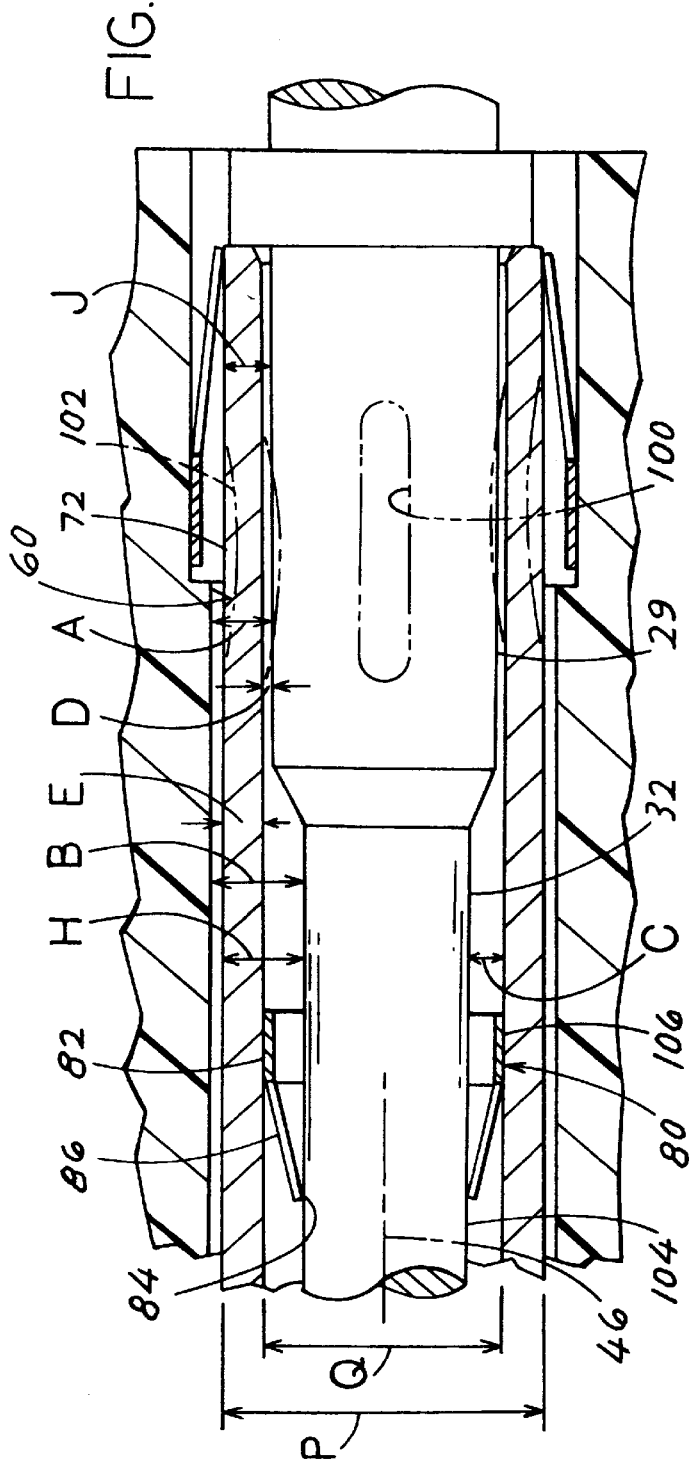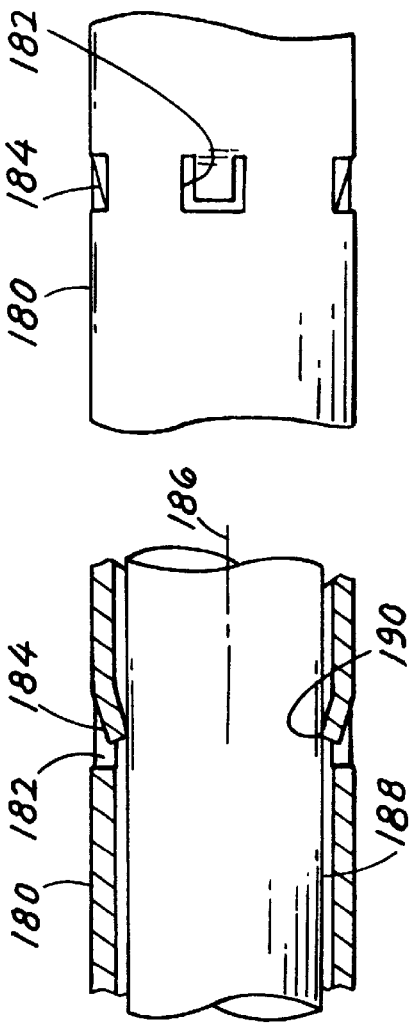

6,098,276

CONTACT FRONT EXTRACTION TOOL

BACKGROUND OF THE INVENTION

An electrical contact is commonly locked in an insulator passage by a locking clip with tines that abut a shoulder on a flange of the contact. The contact can be released from the locking clip by a tool that includes a sleeve that is inserted around the contact and that expands the clip tines so they do not engage the shoulder. Where the contact is a rear-released type, then once the locking clip is in its release position, the contact can be pulled out by pulling rearwardly on the contact tail or a wire that is fixed to the rear end of the contact. It is often desirable to provide a front release contact that can be pulled out to a position forward of the connector, where a new contact can be installed in a free space rather than in a space crowded with wires or tails at the rear of the connector. One type of release tool has a sleeve with a front portion that is inwardly bowed and that has slots forming spring beams. When the sleeve is inserted rearwardly into the insulator passage and the front end of the sleeve expands the locking clip, the spring beams grasp the contact and pull it forwardly out of the connector as the tool is pulled out; however, the resilience of an inwardly-bowed portion of a sleeve is low, so it cannot grasp the contact with a high force to assure reliable pull-out of the contact. A contact extraction tool, especially for a front release contact, which not only releases the locking clip but that also provided a large grasping force to grasp the sleeve and pull it out as the tool is pulled out, would be of value.

SUMMARY OF THE INVENTION

In accordance with one embodiment of the present invention, a contact extraction tool is provided which not only includes a sleeve front end for expanding a locking clip to release the contact, but that also includes a highly resilient grasping clip for securely grasping the contact to pull it out of a connector passage when the tool is pulled out. For a pin-type contact that includes a barrel lying within the locking clip and a smaller diameter pin part extending forwardly from the barrel but still lying within the passage, the tool includes a grasping clip that lies around the smaller diameter pin part to grasp it. The grasping clip includes a substantially cylindrical part that is fixed in place within the sleeve, and a tapered part with a plurality of fingers having free ends that directly engage the pin part of the contact.

For a contact of the socket type wherein the barrel of constant diameter extends along the entire front of the contact, but part of the barrel projects forwardly of the insulator, the sleeve is provided with a larger diameter inside to lie forward of the insulator, and a grasping clip with resilient spring fingers lies therein and grasps a location on the contact that lies forward of the insulator. A large clearance within the sleeve at either the pin part of a pin contact, or within the enlarged inside diameter part of the sleeve that extends around a projecting part of a socket contact, enables a grasping clip to be used which has a large radial dimension between its outside that is mounted in the sleeve and its inside that engages the contact.

The grasping clip is preferably a separate element from the sleeve, with the grasping clip formed of material having higher strength and resilience than the material of the sleeve.

The novel features of the invention are set forth with particularity in the appended claims. The invention will be best understood from the following description when read in conjunction with the accompanying drawings.

BRIEF DESCRIPTION OF THE DRAWINGS

FIG. 2 is an exploded sectional side view of the connector and tool of FIG. 1, with the tool not yet engaged with the contact or connector.

FIG. 4 is an enlarged view of a portion of FIG. 3.

FIG. 5 is an exploded sectional view of a connector that holds a socket type contact and a tool constructed to release the contact, with the tool not yet engaged with the contact or connector.

FIG. 8 is a partial sectional view of a contact and of a tool of another embodiment of the invention.

FIG. 9 is a partial side elevation view of the tool of FIG. 8.

DESCRIPTION OF THE PREFERRED EMBODIMENTS

Figure 1:
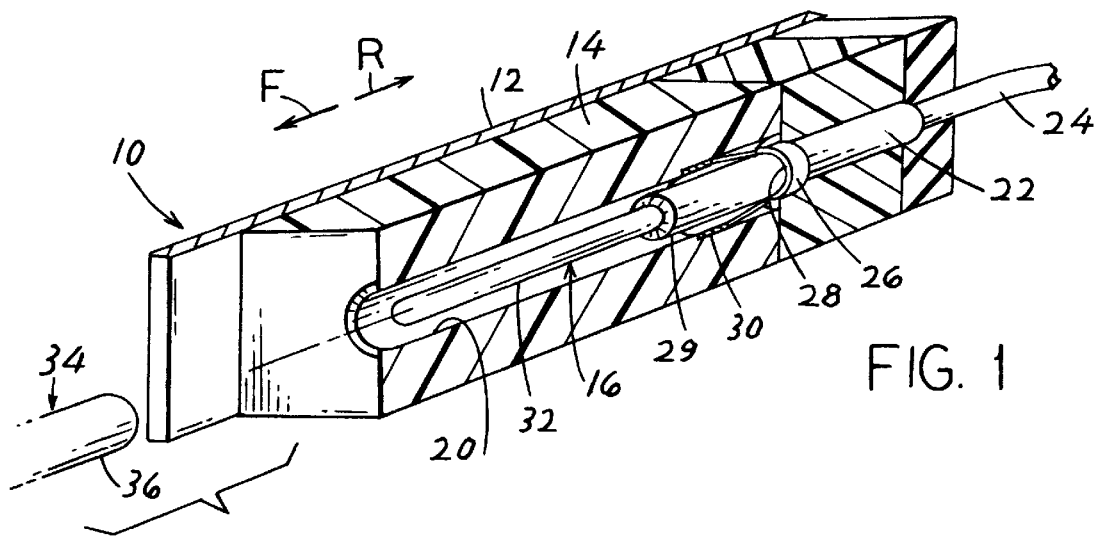
FIG. 1 is an exploded isometric view that includes a sectional view of a connector with a pin contact therein, and a portion of an extraction tool of the present invention that can be used therewith.

FIG. 1 illustrates a connector 10 that includes a shell 12, an insulator 14 lying primarily within the shell, and a pin contact 16 lying within a passage 20 of the insulator. The contact extends in forward and rearward directions F,R and has a termination part 22 at its rear end that terminates to a wire 24, as by crimping or sodering thereto. The contact has a flange 26 with a forwardly-facing contact shoulder 28 thereon. A barrel 29 of the contact extends forwardly from the flange to a pin part 32. A locking clip 30 which engages the contact shoulder 28, prevents forward movement of the contact out of the insulator passage. The contact extraction tool 34 is designed to be inserted into the passage 20 until the rear end 36 of the tool engages the shoulder 28 and expands the locking clip. With the locking clip expanded so it does not engage the shoulder 28, the tool can be withdrawn and the contact can be pulled out along with the tool as both are moved forwardly out of the connector.

Figure 3:
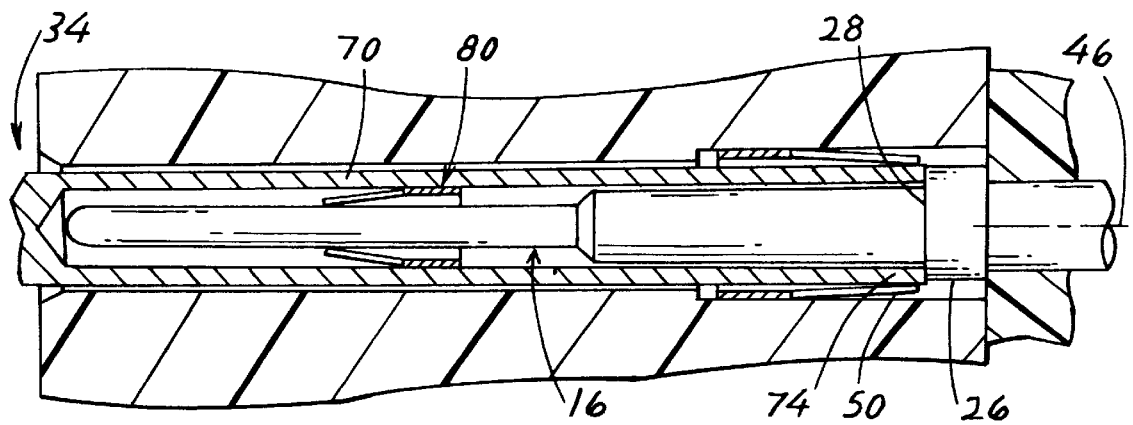
FIG. 3 is a sectional view of a portion of the connector and tool of FIG. 2, with the tool fully inserted into the connector insulator passage.

FIG. 2 shows that the locking clip 30 has a cylindrical part 40 that lies in a clip-receiving groove 42 formed in the insulator passage 20. The locking clip also has a plurality of tines 44 that extend rearwardly and radially inwardly toward the axis 46 of the passage, and that rest against the outside of the barrel 29. The tines have rear ends 50 that engage the contact shoulder 28 to prevent the contact from moving forwardly. It is noted that the contact flange 26 has a rear end 52 that engages a forwardly-facing surface 54 of an insulator part 56 that lies rearward of a front insulator part 58. The passage has a shoulder wall part 60 that forms a rearwardly-facing clip-engaging shoulder 62 that prevents forward movement of the locking clip out of the connector. There is only a small gap or free space 64 of radial dimension A between the outside of the barrel 29 and the inside of the passage at the shoulder wall part 60. As a result, any extraction tool that is to expand the locking clip, must pass through this narrow free space 64 of radial dimension A The contact extraction tool 34 includes a sleeve 70 with a rear end portion 72 that is constructed to fit through the narrow free space 64 until a rear end 74 of the sleeve moves within the rear end 50 of each locking clip tine. FIG. 3 shows the sleeve 70 after it has been fully inserted into the passage and its rear end 74 lies within the clip tine rear ends 50 to expand them so the clip tine rear ends lie further from the axis 46 than the outside of the flange 26, at its shoulder 28. When the tool 34 is withdrawn, the contact 16 also must be withdrawn, and a means must be provided for automatically grasping the contact to pull it out with the tool.

Figures 6, 7:
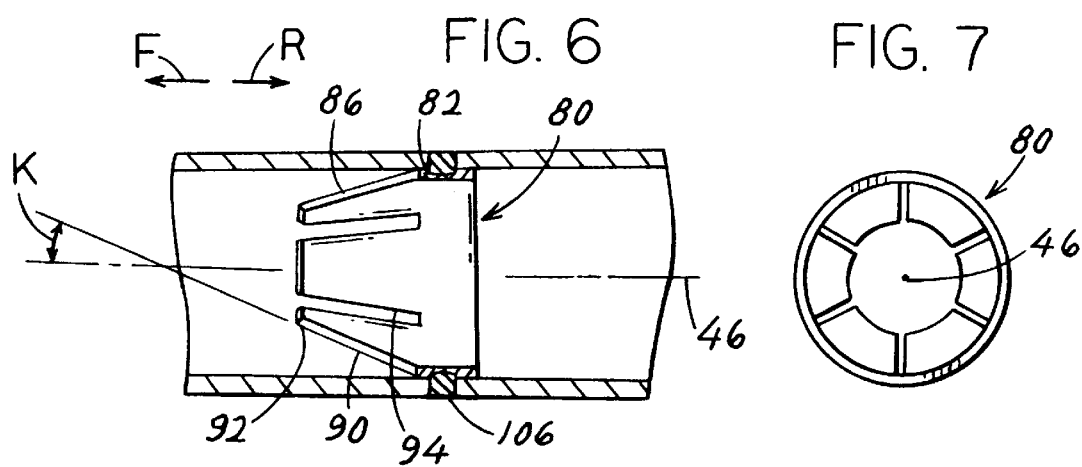
FIG. 6 is a sectional view of a portion of the tool of FIG. 2.
FIG. 7 is a front elevation view of only the grasping clip of the tool of FIG. 6.

In accordance with the present invention, applicant provides a contact grasping clip 80. As shown in FIG. 4, the grasping clip 80 has a considerable radial thickness C as measured between the outside of its cylindrical mounted part 82 and the inside 84 of the free ends of its spring fingers 86. As shown in FIG. 6, the contact grasping clip has a tapered or inclined part 90 that extends at a forward and radially inward (towards axis 46) incline away from the cylindrical mount part 82. As a result, the forward ends 92 of the spring fingers engage the contact. Slits 94 in the tapered part divide it into the spring fingers 90. Referring again to FIG. 4, it can be seen that the radial thickness C of the grasping clip when engaged with the contact, is much greater than the clearance D between the sleeve forward portion 72 and the outside of the barrel 29, so a clip cannot be mounted in that space within the sleeve. In a prior art approach, indicated in phantom lines in FIG. 4, the sleeve was provided with a plurality of slots 100 in its front portion, and with sleeve parts between the slots being permanently bowed inwardly, to form spring beams 102 to grasp the barrel. However, such spring beams 102 had little resilience because they deflect inwardly only a small distance before engaging the barrel. Also, the beams 102 do not have free forward ends to apply concentrated force to the contact to prevent it from slipping along the contact. Also, the sleeve was typically formed of an easy-to-machine or mold material such as brass or plastic, neither of which has high resilience and high strength. By contrast, applicant's clip is of a different material from that of the sleeve. For example, the sleeve can be formed of brass, while the grasping clip 80 is formed of a stronger and more resilient material such as heat-treated beryllium copper.

Applicant is able to use the grasping clip 80 with spring fingers having free ends, by grasping a location 104 of the contact that lies forward of the barrel 29, where the location 104 is of smaller diameter than that of the barrel diameter. Specifically, the location 104 preferably lies along the pin part 32 of the contact, which has a much smaller diameter than that of the barrel 29. Applicant prefers that the spring fingers 86 extend forwardly and inwardly, and have sharp corners at 84 to slightly "dig into" the brass pin part 32 of the contact as the contact is withdrawn. The spring fingers preferably extend at an angle K (FIG. 6) of at least 15° to do this.

A tool that applicant has designed, of the type illustrated in FIGS. 1–4, had a sleeve with an outside diameter P (FIG. 4) of 0.3175 inch with a tolerance of ±0.0005 inch, and inside diameter Q of 0.2775 inch with a tolerance of ±0.0005 inch, for a sleeve thickness E of 0.04 inch. The sleeve was designed to fit into the space between a shoulder wall part 60 and the outside of a contact barrel 29, where the gap dimension A was 0.05 inch, and provided a nominal clearance of 0.005 inch around and within the sleeve. The grasping clip 80 had an outside diameter of 0.2785 inch, so the clip was installed with an interference fit into the inside of the sleeve. Welds at 106 further fixed the grasping clip. The outside diameter of the pin part 32 was 0.06 inch smaller than the outside of diameter Q of the grasping clip, so the radial thickness C into which the clip had to fit was 0.03 inch. Such a gap for the clip allows high resilience for the spring fingers 86. As shown in FIG. 6, the spring fingers 86 extended at an incline of about 22° to the axis 46.

FIG. 5 illustrates a portion of a connector 110 which holds a socket contact 112. The socket contact extends through a short passage 114 in an insulator 116 of the connector. The contact has a flange 120 with a forwardly-facing shoulder 122 that is engaged by tines 124 of a locking clip 126. The gap 130 between the contact barrel 132 and the shoulder wall part 134 is only slightly greater than the thickness of the sleeve forward portion 140 of a sleeve 142 of a contact extraction tool 144. However, the barrel 132 extends along the entire length of the portion of the contact extending forward of the flange 120. The barrel projects forward of the front end 150 of the insulator, where the gap space around the socket contact may extend to a surrounding shell or even further. As a result, applicant provides a contact grasping clip 160 whose outside diameter can be larger than the inside diameter S of the sleeve front portion 140. The sleeve is provided with a sleeve bore having two different diameters at bore parts 162, 164, with the grasping clip 160 lying in the larger diameter bore part 164. When the contact extraction tool 144 is inserted into the insulator passage 114, and the rear end 166 of the sleeve engages the shoulder 122 of the contact, the grasping clip 160 lies forward of the insulator front end 150 and grasps a front portion 170 of the barrel.

FIGS. 8 and 9 illustrate another embodiment of the invention where a sleeve 180 is provided with U-shaped slots 182 that form short spring fingers 184 that extend forwardly and radially inwardly towards the axis 186 of the contact barrel 188. It might be possible to harden only the area of the spring fingers 184, but where the tool is formed of an easily machined material such as brass or a molded plastic, the spring fingers 184 will not have as high a strength and resilience as heat-treated beryllium copper which can be economically provided as a grasping clip that is fixed within a sleeve. The spring fingers are short so they extend at an angle of at least about 15° to the axis 186 at the front finger ends 190.

Thus, the invention provides a contact extraction tool for extracting a contact from an insulator. The tool is especially useful for electrical contacts where the insulator provides electrical insulation, but is also useful in optic fiber contacts where the insulator serves only to mechanically insulate and provide means to hold a locking clip. Applicant provides a clip that is separate from the sleeve that releases the locking clip. The grasping clip has a mount portion that is fixed within the sleeve and has spring fingers with free forwards ends to grasp a part of the contact that is of smaller diameter than the barrel which the locking clip lies against, or to grasp a part of the barrel that lies forward of the insulator.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A contact extraction tool in combination with a contact lying in a passage in an insulator of a connector to extract the contact from the passage, where the contact has a barrel and has a forwardly-facing contact shoulder at a rear end of said barrel, and the connector has a locking clip that can be radially outwardly deflected with respect to an axis of said passage to allow the contact to be moved forwardly out of the connector, wherein said contact has a forward part lying forward of said contact shoulder, wherein:

said tool includes a sleeve with a rear portion having a rear end that fits closely around said barrel to lie between said barrel and said locking clip to radially outwardly deflect said locking clip rear end to release said locking clip;

said tool also includes a contact grasping clip having a plurality of resilient tines with said grasping clip lying in said sleeve at a fixed location forward of said sleeve rear end to automatically engage said forward part of said contact.

2. The contact extraction tool described in claim 1 wherein:

said contact grasping clip has a cylindrical portion, with said plurality of tines extending from said cylindrical portion and having tips lying forward of said cylindrical portion.

3. The contact extraction tool described in claim 1 wherein:

said sleeve has front and rear sections, with said front section having larger inside and outside diameters than inside and outside diameters of said rear section, and said contact grasping clip lies in said front section and said contact grasping clip has an outside diameter that is at least as great as the outside diameter of said sleeve rear end.

4. The contact extraction tool described in claim 1 wherein:

said sleeve is formed of a first material, while said grasping clip is formed of a second material that has greater strength and resilience than said first material.

5. The contact extraction tool described in claim 1 wherein:

said sleeve and said grasping clip are separately formed elements, with said sleeve having an elongated bore and with said clip mounted at said fixed location in said bore.

6. The contact extraction tool described in claim 1 wherein:

said grasping clip comprises a piece of sheet metal that has been formed with a cylindrical rearward part, and with a tapered forward part that is tapered to have a progressively smaller diameter at progressively more forward locations along most of its length, with said forward part having slits extending to its extreme front end that divide said forward part into said tines with free front ends.

7. The combination of a connector that has an insulator with a passage and a contact in the insulator, with a contact extraction tool for extracting the contact from the passage in the insulator, where the contact has a barrel of predetermined length, and has a forwardly-facing contact shoulder at a rear end of said barrel, and has a contact location of smaller diameter than said barrel lying forward of the barrel, and the connector has a locking clip with a rear end that lies around said barrel and that engages said contact shoulder but that can be radially outwardly deflected with respect to an axis of said passage to allow the contact to be moved forwardly out of the connector, wherein:

said tool includes a sleeve with a rear portion that fits around said barrel to lie between said barrel and said locking clip to radially outwardly deflect said locking clip rear end to release said locking clip from said contact shoulder;

said tool also includes a contact grasping clip lying at a fixed location in said sleeve at a location sufficiently forward of said sleeve rear portion to lie around said contact location of smaller diameter, with said grasping clip constructed to grasp said contact location of smaller diameter to pull out said contact as said tool is pulled out of said insulator.

8. A contact extraction tool and a contact that has a barrel and that lies in a passage of an insulator of a connector and is held therein by a locking clip, to extract the contact from the passage, wherein:

said tool includes a sleeve with a rear portion that fits around said contact barrel to radially outwardly deflect said locking clip to release the locking clip;

said tool also includes a contact grasping clip lying at a substantially fixed location with respect to said sleeve, said clip having a cylindrical mount part and a plurality of finger parts extending from said mount part with said finger parts lying in said sleeve at a location forward of said sleeve rear portion.

9. The contact extraction tool described in claim 8 wherein:

said sleeve has front and rear bore portions, with said front bore portion being of greater diameter than said rear bore portion, and said grasping clip lies in said front bore portion.

10. A method for extracting a contact from the front end of a passage in an insulator of a connector where the contact has a barrel of predetermined diameter and the contact has a forwardly-facing contact shoulder at a rear end of said barrel, and the connector has a locking clip with a rear end that lies around said barrel and that engages said contact shoulder but that can be radially outwardly deflected with respect to an axis of said passage to allow the contact to be moved forwardly out of the connector, where the insulator has a clip-receiving groove that receives said locking clip with said groove having an insulator shoulder wall part lying forward of said clip-receiving groove and having a rear end forming a largely rearwardly-facing clip-engaging shoulder, where there is a gap having a radial dimension A between said shoulder wall part and a location on said contact that lies within said shoulder wall, wherein said contact has a forward part lying forward of said contact shoulder where the space around said contact forward part and any insulator thereabout is greater than said gap of radial dimension A, comprising:

positioning a tool that includes a sleeve with a rear portion of predetermined thickness E with a rear end that fits around said barrel, and a contact-grasping clip mounted on the sleeve to slide with it, and sliding said tool rearwardly into said passage so said sleeve rear end is inserted rearwardly between said barrel and said locking clip to radially outwardly deflect said locking clip rear end to release said locking clip from said contact shoulder;

automatically grasping said contact with said contact-grasping clip without manually operating it, at a contact location that lies forward of said sleeve rear end and pulling out said tool.

11. The method described in claim 10 wherein said forward part of said contact lies in said insulator passage but is of smaller diameter than said barrel, and said contact-grasping clip includes a plurality of fingers with free ends, and wherein:

said step of grasping said contact with said contact-grasping clip includes inserting all of said contact-grasping clip into said insulator passage, until said free ends of said fingers lie against said forward part of said contact.

\* \* \* \* \*